Patented Mar. 2, 1954

2,671,040

UNITED STATES PATENT OFFICE 2,671,040

METAL TREATING FLUX

Tunis L. Holmes, Jersey City, N. J., assignor to The M. W. Kellogg Company, Jersey City, N. J., a corporation of Delaware No Drawing. Application April 20, 1950, Serial No. 157,179

2 Claims. (Cl. 148—26)

The present invention relates to the art of heating metals and more particularly to a flux and to a method of generating heat for metal treating or fusing operations by the electric current discharge action of a flux submerged electrode.

For generating heat by the general method referred to, electric current is discharged from an electrode through a flux submerged gap separating said electrode from a body of metal, to create a metal fusing zone. When the method is employed for the production of metal, as for example in the manufacture of ferrous alloy ingots, solid constituents of the metal to be produced are fed into the fusing zone at controlled rates through consumption of the electrode and/or through the feeding of the metal constituents into said fusing zone in pellet, granular or similar flowable form.

I have found that lime-silica systems, lime-silica-spar systems, lime-silica-alumina systems, and the like, are not entirely satisfactory for use as the flux in the electric treating method described and especially for the manufacture of ingots having iron as the base ingredient.

One object of the present invention is to provide a new and improved flux, which is particularly adapted for use in the flux submerged electrode method of treating metal, which has good electrical qualities for said method, which has good fluxing properties, i. e. the capability of taking out undesirable constituents from the fused metal and the ingredients thereof without taking out the desirable ones, which promotes a heat distribution such that the heat generated is propagated at high temperature levels down into the metal treated, which is liquid and of such low viscosity at operating temperatures that it readily flows to cover the whole surface of the metal and because of its heat conductivity distributes the heat uniformly to the metal beneath, which permits and effects removal of generated gases from the fused metal and which does not promote oxidation of the metal ingredients or contains constituents which are reduced.

Another object of the invention is to provide a new and improved method of fusing and/or producing metal by the current discharge action of an electrode submerged in a flux affording the maximum of desirable metal fusing and producing conditions.

It has been found in accordance with the present invention that silica in the prior flux systems, when such systems are employed in the flux submerged electrode process described, has a tendency to be reduced and the silicon produced enters the metal treated thereby to adversely affect the composition of the metal treated.

It has also been found in accordance with the present invention that lime has a highly oxidizing effect on the metal treated at the extremely high temperatures developed in the electrical treating method described when it is used as a component of the flux in the amounts commonly used in the fluxes employed in the steel industry. In almost every case when lime was used in amounts greater than 20%, oxidation of desirable components of the metal treated, such as chromium, carbon, and the like, took place. This oxidation was accompanied by reduction of flux components so that the ultimate effect was a reduction in content of desirable components of the metal treated coupled with an addition of undesirable, or unwanted, components. It has also been found that while a high percentage of lime results in a flux capable of developing high surface temperatures, the heat distribution is not satisfactory as the heat is not directed downwardly into the metal beneath the flux to the extent necessary to provide high temperature levels sufficiently beneath the surface of the metal to enable the heating operation to be carried on efficiently.

It has been discovered in accordance with the present invention that flux systems having a high percentage of alumina do not promote oxidation of components of the metal treated and the accompanying reduction of flux components, furthermore, high percentage alumina fluxes provide superior heat distribution and result in the propagation of heat at high temperature levels well into the metal treated.

The novel flux of the present invention contains high percentages of alumina. Alumina does not by itself make a satisfactory flux for the electrical heating method, above referred to, as it is too refractory and does not possess the proper characteristics. It was also discovered that by the additions thereto of flux components which under the high temperature conditions of said electrical heating method interfuse with the alumina, probably to produce complex alumina systems, a flux system is produced which has all of the required properties and characteristics to a marked degree. It was found that by the controlled addition of fluorspar and magnesia to controlled amounts of alumina, a fully satisfactory flux system is produced which meets every requirement of said electrical heating method and has especial application when said method is employed in the production of metal by the fusion of its components.

High percentage of fluorspar are employed in the novel flux. The fluorspar reduces the melting point of the flux and imparts to the flux the necessary fluidity and electrical and heat conductivity. The high percentages of fluor spar result in the marked ability of the flux for removing gases, and especially hydrogen, from the metals treated or fused by the flux submerged electrode process. However, it has been found that fluxes made up entirely of high percentages of alumina and high percentages of fluorspar are too conductive and do not give satisfactory heat distribution as the heat does not penetrate deeply and at high temperature levels into the metal treated. The magnesia, while it reduces the viscosity of the flux to a limited degree, keeps the conductivity of the flux within the required limits and assures a proper heat distribution. The novel flux furthermore is remarkably stable and does not promote oxidation of components of the metal treated so that it is outstandingly suited to the production of metal ingots by fusion since in such method the components of the metal pass through the molten flux while in sub-divided form.

In accordance with the present invention, the flux developed contains from 35% to 65% alumina, 25% to 55% fluorspar and 10% to 20% magnesia. The novel flux, within the analysis ranges just set forth, has good electrical conductivity and will readily and steadily support the electrical discharge employed in the submerged electrode heating process above described, under the operating conditions of said heating process it is liquid and of sufficiently low viscosity to flow readily to cover the whole surface of the metal treated, the heat conductivity is good so that the heat is conducted at high rates to all portions of the flux menstruum, the heat distribution is satisfactory as the heat generated by the electric current discharge is propagated at high temperature levels well into the metal beneath the flux menstruum and said heat efficiently made use of, the flux does not of itself evolve gases and any gases, and especially hydrogen, evolved or liberated during said electric heating process are removed out of the metal, and the flux is extremely stable and does not promote oxidation of components of the metal treated nor are components of the flux reduced and added to the metal.

The following example illustrates a specific flux embodying the principles of the present invention and having the desirable properties and characteristics above enumerated, this example is illustrative and is not to be construed as limiting the invention:

| | Per cent |
|---|---|
| Al₂O₃ | 50% |
| CaF₂ | 40% |
| MgO | 10% |

The above flux has good heat producing ability, it has the ability to remove gases, especially hydrogen, and to direct effectively the heat generated downward into the meal bath and at operating temperatures is sufficiently liquid and non-viscous. Moreover, the flux has good electrical characteristics and is capable of supporting an electrical discharge within itself of the amperage and voltage employed in the electrical treating processes above mentioned, while maintaining a proper gap between the electrode tip and the surface of the metal bath. Furthermore, the flux neither adds undesirable ingredients to the metal bath nor removes desirable ingredients therefrom.

It is to be understood that when the components of the novel flux and the respective percentages thereof are referred to in this specification and the appended claims it is not intended to indicate pure materials but rather materials of the usual commercial grades containing the usual impurities in the usual quantities.

In carrying out the method of the present invention, the steps are substantially those described in Patent No. 2,191,479, dated February 27, 1940, except for the flux employed. In this method, as applied to the production of cast bodies, especially those having iron as the base ingredient, an electrode is employed extending into a mold. If this electrode is consumable, it contains at least one of the ingredients of the metal to be produced and deposited into said mold. Other constituents of the deposited metal can be furnished in the flowable form of granules, pellets, powders, or the like, into the meal fusing zone created by the electrode, so that these other constituents in conjunction with said electrode produce a metal in the mold having the required analysis. The electrode may be non-consumable, and in Patent No. 2,370,467, dated February 27, 1945, so that the metal ingredients are supplied in the subdivided form indicated.

The lower end of the electrode is submerged in a floating layer of flux having the specific composition described above and is spaced above the upper surface of the deposited metal by a gap. This flux refines the metal as it is produced, promotes fusion of the metal, protects it against atmospheric contamination and insulates it against rapid heat loss. In addition, it has the properties and functions described above.

The electrode and the deposited metal are electrically connected in the same circuit, so that current, as it is discharged from said electrode, passes through the submerged gap and creates thereby a high temperature zone in which the solid metal ingredients are readily fused. The flux easily and steadily supports the electric current discharge.

As the metal producing operation progresses, the level of the deposited metal as well as that of the flux layer gradually rises. As the level of the deposited metal rises, the electrode is moved with respect to the body of metal deposited at a rate necessary to maintain the current discharge gap substantially constant in length.

While the invention has been described with particular reference to a specific embodiment, it is to be understood that it is not to be limited thereto, but is to be construed broadly and restricted solely by the scope of the appended claims.

What is claimed is:

1. A flux for metal treating operations in which heat is generated by the discharge of electric current from the end of an electrode through a gap submerged beneath the surface of a depth of flux, said flux consisting essentially of 25 to 55% fluorspar, 35 to 65% alumina, 10 to 20% magnesia, and small quantities of other materials that do not substantially modify the character of the flux, said fluorspar, said alumina, and said magnesia being present in said flux prior to the use of said flux in said metal treating operations, as uncombined materials.

2. A flux for metal treating operations in which heat is generated by a discharge of electric current from the end of an electrode through a gap submerged beneath the surface of a depth of flux, said flux consisting essentially of about 40% fluorspar, 50% alumina, and 10% magnesia, said fluorspar, said alumina, and said magnesia being present in said flux prior to the use of said flux in said metal treating operations, as uncombined materials.

TUNIS L. HOLMES.

References Cited in the file of this patent

UNITED STATES PATENTS

| Number | Name | Date |
|---|---|---|
| 277,393 | Whitcomb | May 8, 1883 |
| 1,945,565 | Pokorny et al. | Feb. 6, 1934 |
| 2,150,625 | Jones et al. | Mar. 14, 1939 |
| 2,191,479 | Hopkins | Feb. 27, 1940 |
| 2,235,077 | McMullen | Mar. 18, 1941 |
| 2,282,175 | Emerson | May 5, 1942 |
| 2,397,737 | Heuer | Apr. 2, 1946 |
| 2,432,773 | Lee | Dec. 16, 1947 |
| 2,461,697 | Queneau | Feb. 15, 1949 |

OTHER REFERENCES

The Condensed Chemical Dictionary, 3rd ed., by Gregory, published 1942 by the Reinhold Publishing Corp., New York, N. Y. Page 306.